USS009346536B2

(12) United States Patent
Raghu

(10) Patent No.: US 9,346,536 B2
(45) Date of Patent: May 24, 2016

(54) EXTERNALLY DRIVEN FLOW CONTROL ACTUATOR

(71) Applicant: The Boeing Company, Chicago, IL (US)

(72) Inventor: Surya Raghu, Ellicott City, MD (US)

(73) Assignee: THE BOEING COMPANY, Chicago, IL (US)

( * ) Notice: Subject to any disclaimer, the term of this patent is extended or adjusted under 35 U.S.C. 154(b) by 442 days.

(21) Appl. No.: 13/652,891

(22) Filed: Oct. 16, 2012

(65) Prior Publication Data
US 2014/0103134 A1  Apr. 17, 2014

(51) Int. Cl.
B64C 21/04  (2006.01)
B64C 21/08  (2006.01)

(52) U.S. Cl.
CPC ............... B64C 21/04 (2013.01); B64C 21/08 (2013.01); B64C 2230/04 (2013.01); B64C 2230/06 (2013.01); B64C 2230/18 (2013.01); Y02T 50/166 (2013.01)

(58) Field of Classification Search
CPC ............ F15C 1/22; F15C 1/04; B05B 1/08
USPC .......................... 137/833, 834, 835, 825, 826
See application file for complete search history.

(56) References Cited

U.S. PATENT DOCUMENTS

| 3,216,439 | A | * | 11/1965 | Manion | 137/810 |
|---|---|---|---|---|---|
| 3,238,958 | A | * | 3/1966 | Warren et al. | 137/836 |
| 3,247,861 | A | * | 4/1966 | Bauer | 137/811 |
| 3,289,687 | A | * | 12/1966 | Dunaway | 137/831 |
| 3,302,398 | A | | 2/1967 | Taplin et al. | |
| 3,376,881 | A | | 4/1968 | Godwin | |
| 3,448,752 | A | | 6/1969 | O'Neill | |
| 3,942,559 | A | | 3/1976 | Kranz et al. | |
| 4,151,955 | A | | 5/1979 | Stouffer | |
| 4,291,395 | A | | 9/1981 | Holmes | |
| 4,313,470 | A | | 2/1982 | Tippetts | |
| 4,596,364 | A | * | 6/1986 | Bauer | 239/589.1 |
| 4,721,251 | A | | 1/1988 | Kondo et al. | |
| 4,774,975 | A | | 10/1988 | Ayers et al. | |
| 4,844,128 | A | * | 7/1989 | Hockaday | 137/828 |
| 5,181,660 | A | | 1/1993 | Stouffer et al. | |
| 5,971,301 | A | | 10/1999 | Stouffer et al. | |
| 6,009,180 | A | | 12/1999 | Andersson | |
| 6,805,164 | B2 | | 10/2004 | Stouffer | |
| 7,080,664 | B1 | | 7/2006 | Ayer | |
| 7,096,888 | B1 | | 8/2006 | Thurston et al. | |
| 7,128,082 | B1 | | 10/2006 | Cerretelli et al. | |
| 8,277,116 | B2 | | 10/2012 | Winkler et al. | |
| 2008/0149205 | A1 | | 6/2008 | Gupta et al. | |
| 2008/0279041 | A1 | | 11/2008 | Winkler et al. | |

(Continued)

OTHER PUBLICATIONS

Office Action, dated Jun. 2, 2014, regarding U.S. Appl. No. 13/652,865, 19 pages.

(Continued)

Primary Examiner — Mary McManmon
Assistant Examiner — Nicole Wentlandt
(74) Attorney, Agent, or Firm — Yee & Associates, P.C.

(57) ABSTRACT

A method and apparatus for managing a flow of a fluid. The fluid is received at an input port of a structure. The fluid is sent through a chamber in communication with the input port. The fluid is caused to flow from the chamber and out of an output port in a direction that changes with a frequency based on an application of pressure pulses in the chamber.

20 Claims, 14 Drawing Sheets

(56) References Cited

U.S. PATENT DOCUMENTS

2011/0005334 A1 1/2011 Haynes et al.
2014/0102542 A1 4/2014 Raghu

OTHER PUBLICATIONS

Woszidlo et al., "Parametric Study of Sweeping Jet Actuators for Separation Control," 5th Flow Control Conference, Jun. 2010, 21 Pages.

Gokoglu et al., "Numerical Studies of a Supersonic Fluidic Diverter Actuator for Flow Control," 5th Flow Control Conference, Jun. 2010, 16 Pages.

Guyot et al., "Active Combustion Control Using a Fuidic Oscillator for Asymmetric Fuel Flow Modulation," 44th AIAA/ASME/SAE/ASEE Joint Propulsion Conference and Exhibit, Jul. 2008, 19 Pages.

Crittenden et al., "Combustion Powered Actuator with Integrated High Frequency Oscillator," International Conference on Jets, Wakes, and Separated Flows, Sep. 2008, 8 Pages.

Guyot et al., A Fluidic Actuator for Active Combustion Control, Proceedings of the GT2008 ASME Turbo Expo 2007: Power for Land, See and Air, Jun. 2008, 13 Pages.

Guyot et al., "Active Control of Combustion Instability Using a Fluidic Actuator," 46th AIAA Aerospace Sciences Meeting and Exhibit, Jan. 2008, 12 Pages.

Gregory et al., "Characterization of a Micro Fluidic Oscillator for Flow Control," 2nd AIAA Flow Control Conference, Jun. 2004, 14 Pages.

Raman et al., "Jet thrust vectoring using a miniature flu8idic oscillator," The Aeronautical Journal of the Royal Aeronautical Society, Mar. 2005, 11 Pages.

Raman et al., "Cavitity Resonance Suppression Using Miniature Fluidic Oscillators," Technical Notes, AIAA Journal, vol. 42, No. 12, Dec. 2004, 4 Pages.

Sakaue et al., "Porous Pressure-Sensitive Paint for Characterizing Unsteady Flowfields," AIAA Journal, vol. 40, No. 6, Jun. 2002, 5 Pages.

Gregory et al., "Variable-Frequency Fluidic Oscillator Driven by Piezoelectric Devices," 43rd AIAA Aerospace Sciences Meeting and Exhibit, Jan. 2005, 12 Pages.

Raman et al., "Evaluation of Flip-Flop Jet Nozzles for Use as Practical Excitation Devices," Journal of Fluids Engineering, vol. 116, Sep. 1994, pp. 508-515.

Raman et al., "Jet Mixing Control Using Excitation from Miniature Oscillating Jets," Technical Notes, AIAA Journal, vol. 33, No. 2, Feb. 1995, pp. 365-368.

Raman et al., "Miniature Fluidic Oscillators for Flow and Noise Control," AIAA 2000-2554, Fluids 2000 Conference and Exhibit, Jun. 2000, 16 Pages.

"NASA Langley's Flow Control Devices," Langley Research Center, National Aeronautics and Space Administraction, Mar. 2012, 2 Pages.

Gregory et al., "Variable-Frequency Fluidic Oscillator Driven by a Piezoelecctric Bender," AIAA Journal, vol. 47, No. 11, Nov. 2009, pp. 2717-2725.

Gregory et al., "Switching Behavior of a Plasma-Fluidic Actuator," 45th AIAA Aerospace Sciences Meeting and Exhibit, Jan. 2007, 11 Pages.

Raghu, "Flow Control Actuator With an Adjustable Frequency," U.S. Appl. No. 13/652,865, filed Oct. 16, 2012, 50 pages.

Final Office Action, dated Nov. 20, 2014, regarding U.S. Appl. No. 13/652,865, 14 pages.

Notice of Allowance, dated Feb. 3, 2015, regarding U.S. Appl. No. 13/652,865, 7 pages.

* cited by examiner

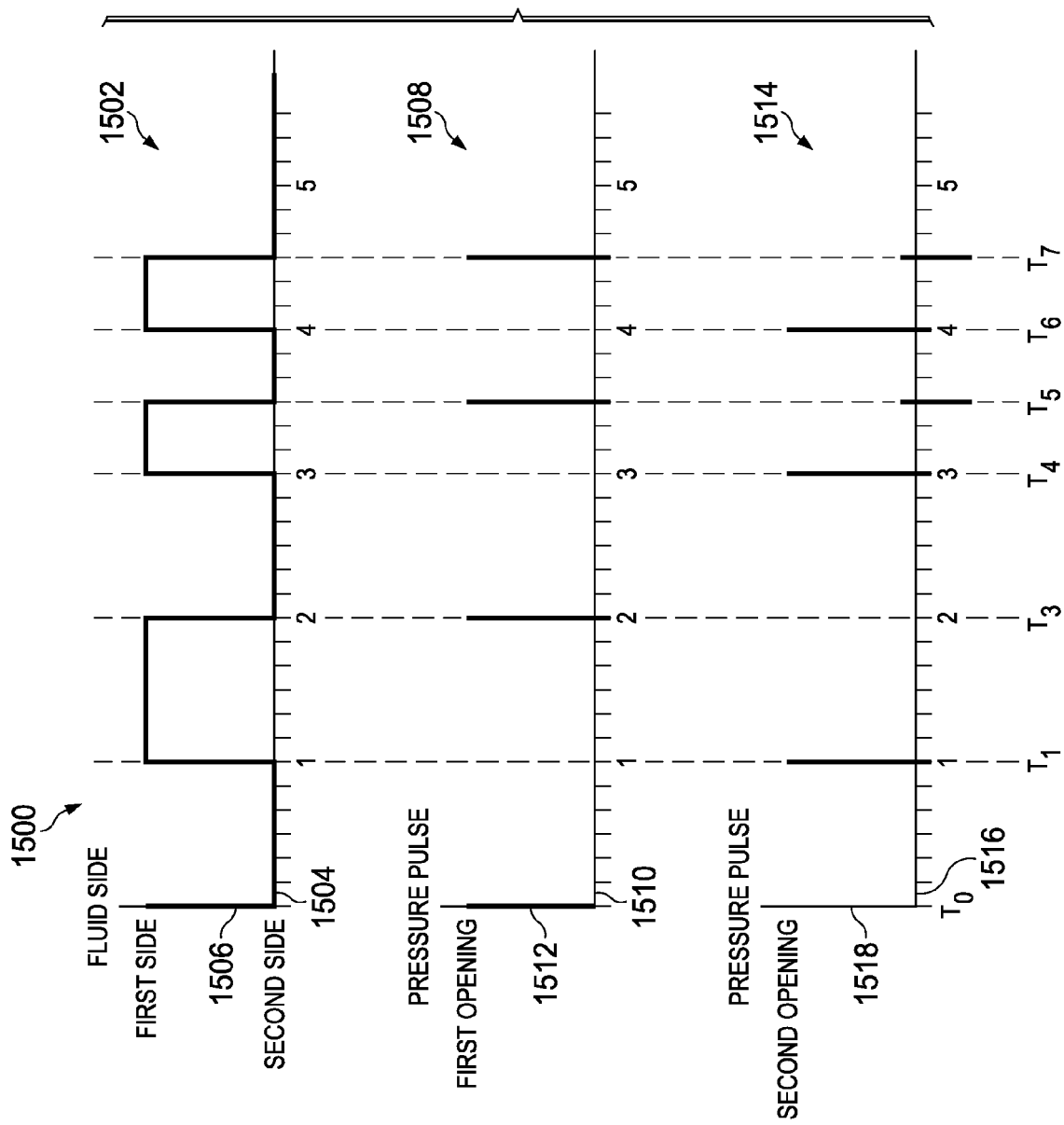

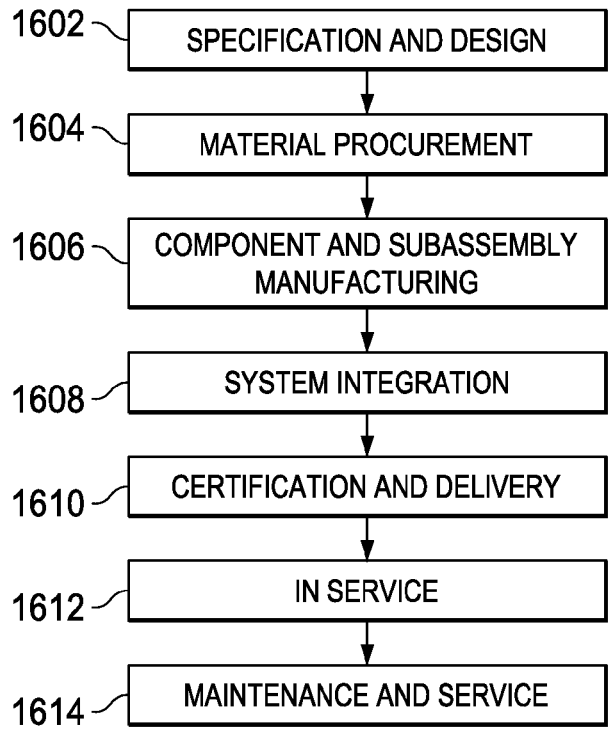
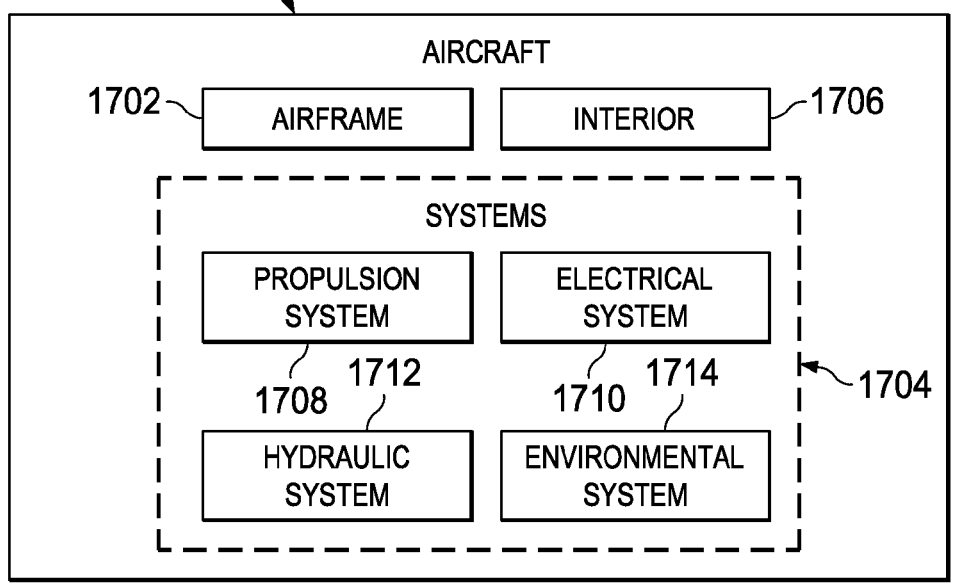

EXTERNALLY DRIVEN FLOW CONTROL ACTUATOR

CROSS-REFERENCE TO RELATED APPLICATION

This application is related to the following patent application: entitled "Flow Control Actuator with an Adjustable Frequency", Ser. No. 13/652,865; filed even date hereof, issued as U.S. Pat. No. 9,120,563 on Sep. 1, 2015, assigned to the same assignee, and incorporated herein by reference.

BACKGROUND INFORMATION

1. Field

The present disclosure relates generally to aircraft and, in particular, to fluid flow for an aircraft. Still more particularly, the present disclosure relates to a method and apparatus for controlling the aerodynamics of an aircraft using a fluid flow control actuator that is externally driven.

2. Background

In operating an aircraft, fluid flow control systems may be used for desired operation of the aircraft and the components within or on the aircraft. These fluid flow control systems may be used during different phases of operation of the aircraft. For example, these systems may be used during take-off, in flight, landing, taxiing on the runway, or during other phases of operation while the aircraft is in service. These fluid flow control systems may be used to control the flow of fluid over, in, or through various portions of an aircraft during these phases of operation.

Flow control actuators may be used in a fluid flow control system to maintain a desired flow of a fluid such as air. These flow control actuators may be used to maintain a desired flow of fluid in an aircraft for many different purposes. For example, flow control actuators may be used in jet inlet and exhaust systems, environmental systems, control surface systems, and other systems in an aircraft. Flow control actuators may be used to maintain desired boundary layers on control surfaces, to reduce noise, or to control fluid flow for other suitable purposes within the aircraft.

A currently used type of flow control actuator may take the form of a fluidic oscillator. This type of flow control actuator is designed to produce a flow of fluid moving in a sweeping manner from side to side at an output port of the flow control actuator. These oscillations of fluid flow occur at a particular frequency. The fluid flow output by a fluidic oscillator that moves in a sweeping manner may be referred to as a sweeping jet.

Changing the frequency of the flow of fluids sweeping from side to side to control fluid flow in a particular system may be desirable in some cases. This frequency may be changed to provide a desired fluid flow for a particular aircraft structure by changing the flow rate of fluid into the fluidic oscillators. Currently, the frequency of the flow of fluid out of a fluidic oscillator may be changed by replacing the fluidic oscillator with another fluidic oscillator. Replacement may be undesirable when dynamic control of fluid flow by the fluid flow system is desired.

Further, the frequency of oscillations in fluidic oscillators may be changed during operation of the fluidic oscillator by altering the supply pressure of the fluid to the fluid oscillator. However, in some cases, changing the fluid flow through the fluidic oscillator may not be desirable. For example, changing the fluid flow may use more energy than desired in the source of the fluid flow for the fluidic oscillator. In other cases, increased maintenance may be needed for the fluid source supplying fluid to the fluidic oscillator. Therefore, it would be desirable to have a method and apparatus that takes into account at least some of the issues discussed above, as well as possibly other issues.

SUMMARY

In one illustrative embodiment, an apparatus comprises a structure having an input port and an output port, a chamber within the structure, a first opening in the chamber, and a second opening in the chamber. The chamber is configured to channel a fluid from the input port to the output port of the structure. The first opening and the second opening are configured to receive pressure pulses.

In another illustrative embodiment, a flow control system comprises a plurality of flow control actuators, a chamber, a first opening in the chamber, a second opening in the chamber, and a pressure source. Each of the plurality of flow control actuators comprises a structure having an input port and an output port. The chamber is within the structure and is configured to channel a fluid from the input port to the output port of the structure. The pressure source is configured to send pressure pulses to one of the first opening and the second opening in the each of the plurality of flow control actuators.

In yet another illustrative embodiment, a method for managing a flow of a fluid is present. The fluid is received at an input port of a structure. The fluid is sent through a chamber in communication with the input port. The fluid is caused to flow from the chamber and out of an output port in a direction that changes with a frequency based on an application of pressure pulses in the chamber.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 15 is an illustration of timing diagrams for a flow control actuator in accordance with an illustrative embodiment;

FIG. 16 is an illustration of an aircraft manufacturing and service method in accordance with an illustrative embodiment; and FIG. 17 is an illustration of an aircraft in which an illustrative embodiment may be implemented.

DETAILED DESCRIPTION

The illustrative embodiments recognize and take into account one or more different considerations. For example, the illustrative embodiments recognize and take into account that changing the pressure in the input of the fluidic oscillator may only change the frequency by an amount that may not be sufficient for the desired frequency range.

Additionally, the illustrative embodiments also recognize and take into account that changing the pressure of the fluid supplied to the fluidic oscillator may also change the velocity, momentum, or both the velocity and the momentum of the fluid that flows out of the fluidic oscillator. This type of change in output also may be undesirable in some cases. Further, changing the pressure from a fluid source such as a bleed air supply or an auxiliary power unit to provide desired frequency in the fluidic oscillator may require the use of more energy than desired.

Thus, the illustrative embodiments provide a method and apparatus for controlling the fluid output from an apparatus such as a fluidic oscillator. The illustrative embodiments may be applied to any apparatus that generates fluid flow at an output port that changes frequency in the movement of the fluid flow that sweeps between a first side and a second side at the output port.

In one illustrative embodiment, an apparatus comprises a structure and a chamber. The structure has an input port and an output port. The chamber is located within the structure and is configured to channel a fluid from the input port to the output port of the structure. Additionally, a first opening and a second opening are present in the chamber. The first opening and the second opening are configured to receive pressure pulses.

In these illustrative examples, the frequency of the flow of fluid may be the rate, manner, or both the rate and manner of the fluid flow in a particular direction. This direction may be in a sweeping fashion from side to side. More specifically, the fluid may flow out of the output port in a stream that may move from side to side at a particular frequency. In other words when the flow of fluid sweeps at the output port, the flow of fluid moves from side to side. The side to side movement may not actually touch the sides of the output port, depending on the implementation.

In these illustrative examples, the frequency in the change in direction of the flow of fluid out of the output port may be controlled using the pressure pulses received at the first opening and the second opening in the chamber. These pressure pulses may be applied to the first opening and the second opening in a manner that controls the direction of the flow of fluid flowing out of the output port.

Figure 1:
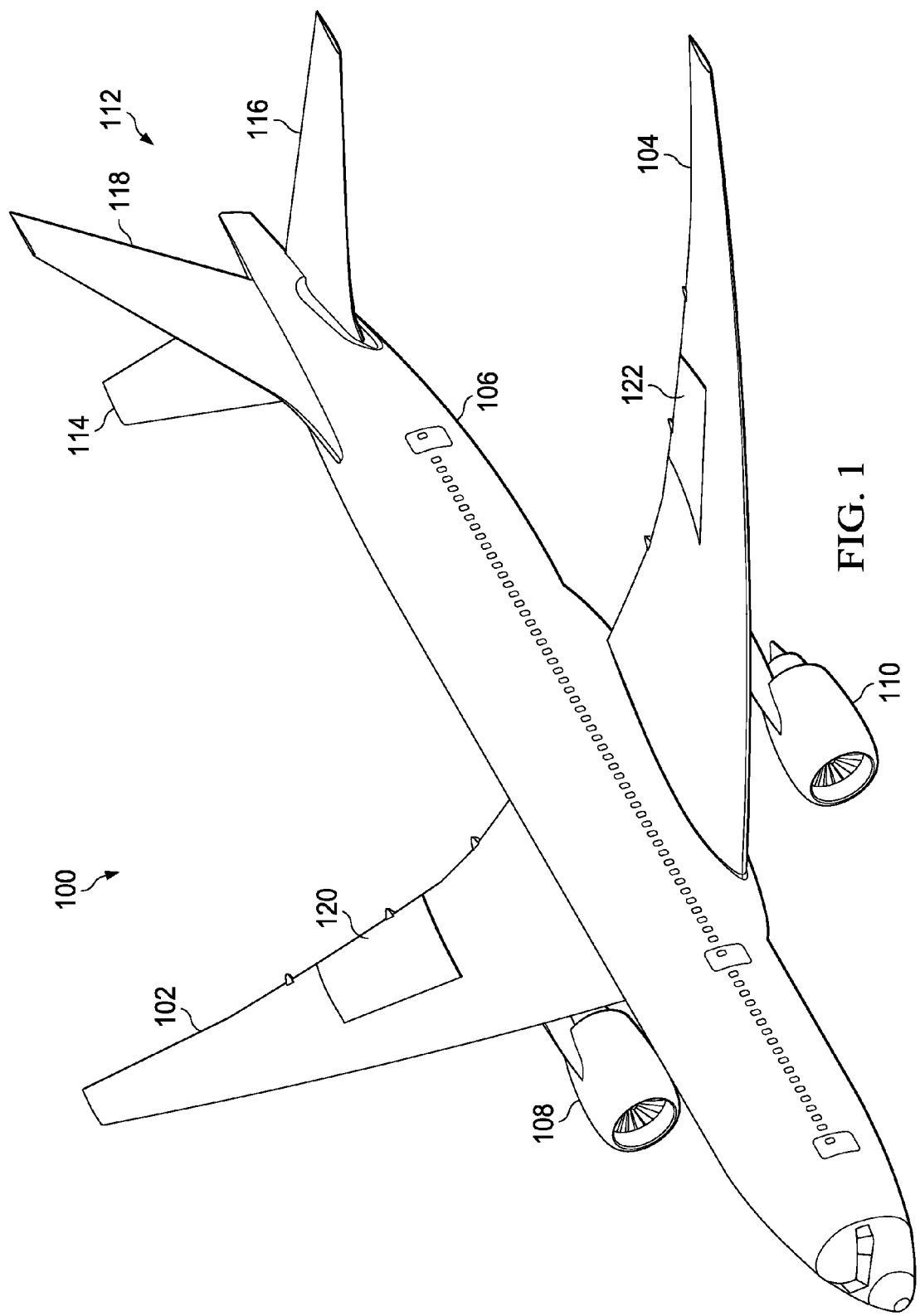
FIG. 1 is an illustration of an aircraft in accordance with an illustrative embodiment.

With reference now to the figures and, in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which flow control actuators may be implemented to control the flow of fluid for aircraft 100. In particular, flow control actuators in the form of fluidic oscillators may be implemented in aircraft 100 to perform various functions such as maintaining a desired airflow. For example, fluid oscillators may be used to maintain desired airflow such as a boundary layer over wing 102, wing 104, horizontal stabilizer 114, horizontal stabilizer 116, and vertical stabilizer 118.

Further, fluid oscillators also may be employed to control surfaces such as flap 120 and flap 122. As another illustrative example, fluidic oscillators may be used with engine 108 and engine 110 as well as other structures to reduce noise generated by aircraft 100.

Figure 2:
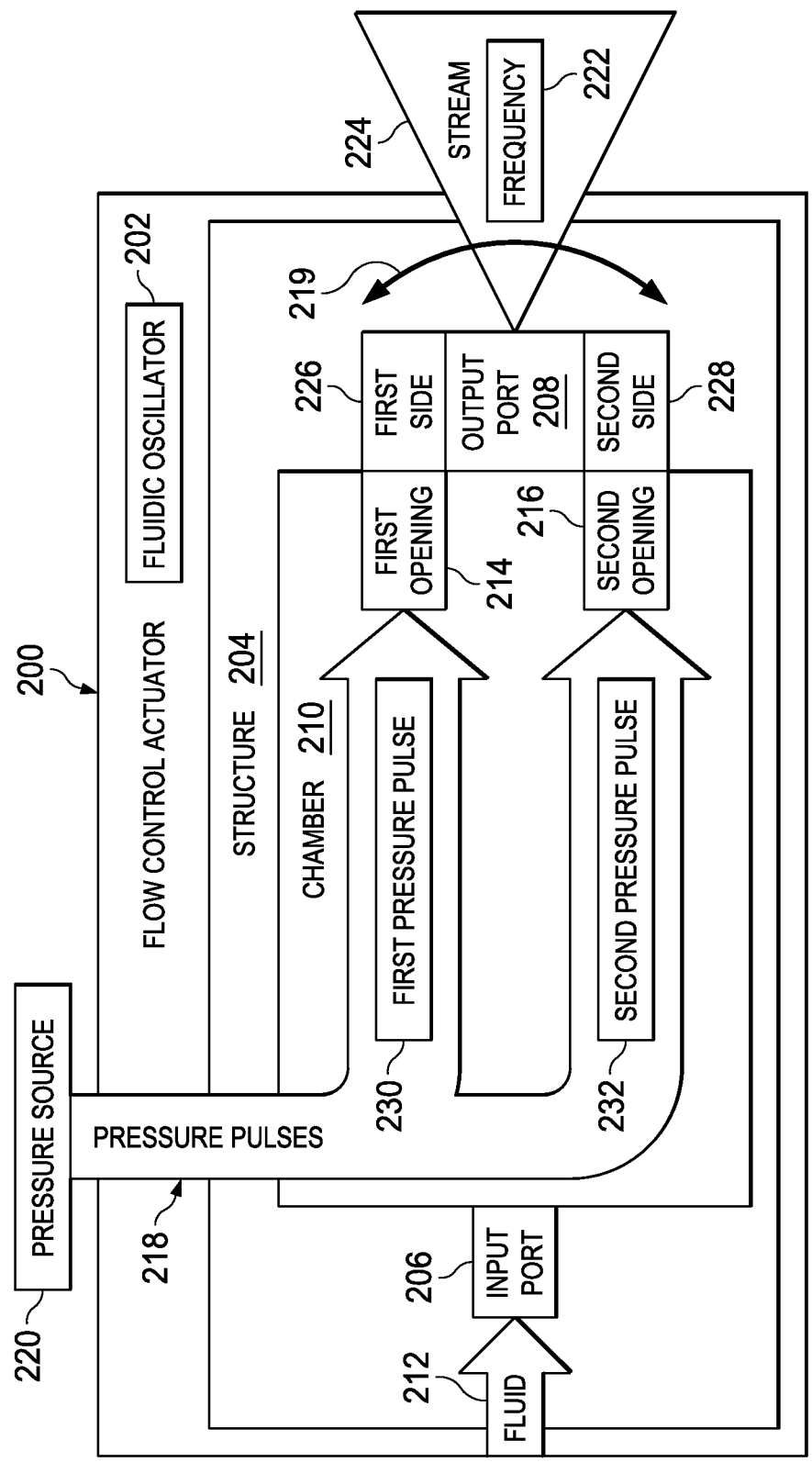
FIG. 2 is an illustration of a block diagram of a flow control actuator in accordance with an illustrative embodiment.

Turning now to FIG. 2, an illustration of a block diagram of a flow control actuator is depicted in accordance with an illustrative embodiment. In this illustrative example, flow control actuator 200 may be used in aircraft 100 in FIG. 1. In this illustrative example, flow control actuator is an externally driven flow control actuator.

As depicted, flow control actuator 200 may take the form of fluidic oscillator 202. In this illustrative example, flow control actuator 200 is comprised of structure 204 having input port 206 and output port 208. Additionally, chamber 210 is located within structure 204. In this illustrative example, chamber 210 is an enclosed space in structure 204. Structure 204 may be comprised of a material selected from one of a metal, plastic, steel, aluminum, titanium, polycarbonate, or other suitable types of materials.

As depicted, chamber 210 is configured to channel fluid 212 from input port 206 to output port 208 of structure 204. Fluid 212 may be, for example, without limitation, air, nitrogen, carbon dioxide, a liquid fuel, a gas fuel, or some other suitable type of fluid.

In this illustrative example, first opening 214 is present in chamber 210. Additionally, second opening 216 also is present in chamber 210. First opening 214 and second opening 216 are configured to receive pressure pulses 218. Pressure pulses 218 may originate from pressure source 220. Pressure source 220 may take various forms. For example, pressure source 220 may be selected from at least one of a pressurized fluid source, an acoustic system, a laser system, a spark generation unit, and some other suitable source.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

In these illustrative examples, pressure source 220 is configured to generate pressure pulses 218 and send pressure pulses 218 to at least one of first opening 214 and second opening 216 in chamber 210. The application of pressure pulses 218 to one of first opening 214 and second opening 216 results in pressure pulses 218 being applied within chamber 210. The application of pressure pulses 218 to one of first opening 214 and second opening 216 is configured to change frequency 222 at which fluid 212 changes direction when flowing out of output port 208.

In this illustrative example, fluid 212 flows in the form of stream 224. Stream 224 sweeps with frequency 222. In these illustrative examples, stream 224 moves in a sweeping motion from side to side as depicted by arrow 219. In these illustrative examples, stream 224 may take the form of a jet stream of air.

In these illustrative examples, the change in the direction of flow of fluid 212 out of output port 208 is a sweeping motion between first side 226 of output port 208 and second side 228 of output port 208. In this illustrative example, first opening 214 is located on first side 226 of output port 208. Second opening 216 is located on second side 228 of output port 208. In these illustrative examples, first pressure pulse 230 in pressure pulses 218 is configured to cause a flow of fluid 212 occurring on first side 226 of output port 208 to change direction to second side 228 of output port 208. Second pressure pulse 232 applied to second opening 216 is configured to cause the flow of fluid 212 occurring on second side 228 of output port 208 to change direction to first side 226 of output port 208.

The illustration of flow control actuator 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
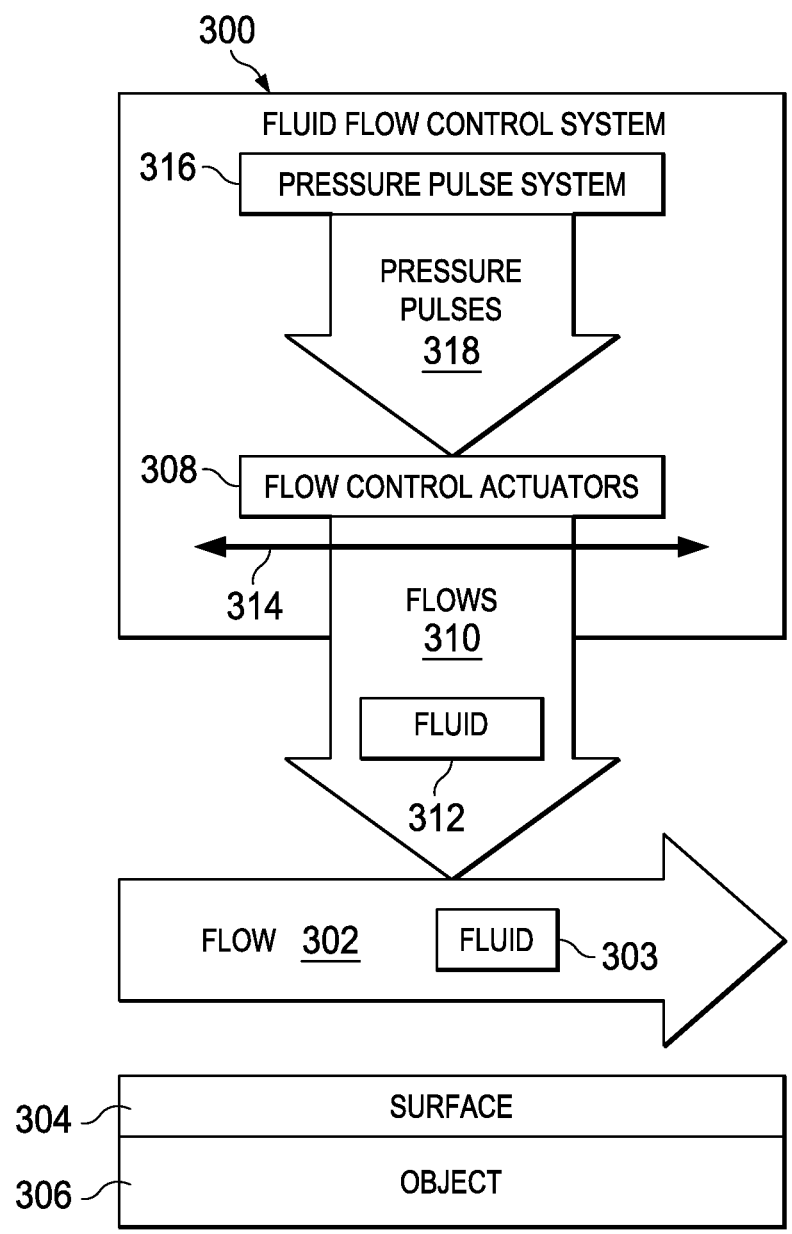
FIG. 3 is an illustration of a fluid flow control system in accordance with an illustrative embodiment.

In FIG. 3, an illustration of a fluid flow control system is depicted in accordance with an illustrative embodiment. In this depicted example, fluid flow control system 300 may be used to control flow 302 of fluid 303 over surface 304 of object 306. Object 306 may be, for example, aircraft 100 in FIG. 1, or some part of aircraft 100 in FIG. 1. In other illustrative examples, object 306 may be a ground vehicle, an engine inlet, or some other suitable object.

In this illustrative example, fluid flow control system 300 is comprised of flow control actuators 308. One or more of flow control actuators 308 may be implemented using flow control actuator 200 in FIG. 2. As depicted, flow control actuators 308 may generate flows 310 of fluid 312 that are introduced into flow 302 of fluid 303. Flows 310 of fluid 312 may be used to manage the manner in which flow 302 of fluid 303 flows over surface 304 of object 306.

In these illustrative examples, flows 310 of fluid 312 may change direction from side to side as indicated by arrow 314 out of flow control actuators 308. This change in direction may be in a sweeping motion. In these illustrative examples, fluid 312 may be the same fluid as fluid 303 or may be a different fluid depending on the particular implementation.

In these illustrative examples, pressure pulse system 316 sends pressure pulses 318 to flow control actuators 308. Pressure pulse system 316 may be comprised of a group of pressure pulse sources. As used herein, a "group of" when used with reference to items means one or more items. For example, a group of pressure pulse sources is one or more group of pressure pulses.

The application of these pressure pulses to flow control actuators 308 control the change in direction of flows 310 of fluid 312. The application of pressure pulses 318 to flow control actuators 308 may be such that the frequency in the movement of flows 310 of fluid 312 are synchronized. In other words, the sweeping motion of flows 310 of fluid 312 may all move in the same manner. In other illustrative examples, different flows within flows 310 may have different frequencies and may point in different directions from other flows within flows 310.

The phase and the frequency of the pressure pulses to flow control actuators 308 may be selected in response to the phase and frequency of the pressure fluctuations in flow 302 such that the desired characteristics are present in flow 302. In this illustrative example, the frequency input, phase input, or both of the inputs to pressure pulse system 316 that control pressure pulses 318 may be obtained from flow 302 in a location upstream of where flow 302 is modified by flows 310.

Figure 4:
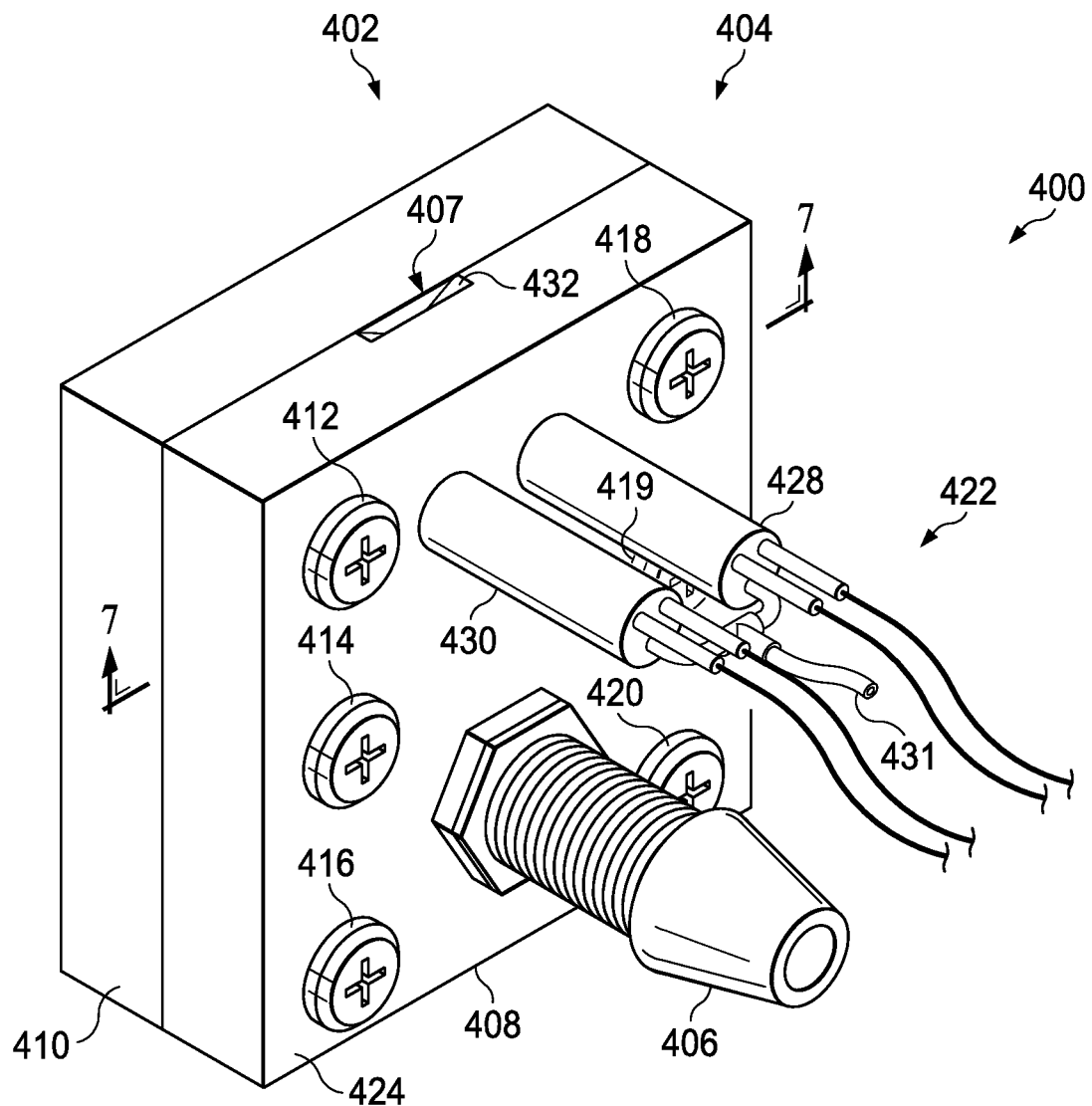
FIG. 4 is an illustration of a flow control actuator in accordance with an illustrative embodiment.

Turning now to FIG. 4, an illustration of a flow control actuator is depicted in accordance with an illustrative embodiment. Flow control actuator 400 is an example of one physical implementation of flow control actuator 200 shown in block form in FIG. 2. As depicted, flow control actuator 400 may be fluidic oscillator 402.

In this illustrative example, flow control actuator 400 is comprised of structure 404 having input port 406 and output port 407. Structure 404 is an example of an implementation of structure 204 shown in block form in FIG. 2. Input port 406 and output port 407 are examples of physical implementations for input port 206 and output port 208 shown in block form in FIG. 2.

As depicted in this particular example, structure 404 is comprised of more than one part. In particular, structure 404 is comprised of first planar member 408 and second planar member 410. These planar members may be connected to each other through fastener 412, fastener 414, fastener 416, fastener 418, fastener 419, and fastener 420.

In this illustrative example, pressure source 422 is associated with first planar member 408. Pressure source 422 is an example of an implementation for pressure source 220 in FIG. 2. As depicted, pressure source 422 includes first actuator 428 and second actuator 430. As depicted, first actuator 428 and second actuator 430 are associated with first planar member 408. First actuator 428 and second actuator 430 control the application of pressure pulses to a chamber (not shown) within the interior of structure 404.

Line 431 is connected to both first actuator 428 and second actuator 430. First actuator 428 controls a fluid under pressure within line 431. When first actuator 428 is activated, fluid within line 431 may flow through first actuator 428 into the chamber in structure 404. Similarly, when second actuator 430 is active, fluid may flow through second actuator 430 into the chamber in structure 404.

In this illustrative example, input port 406 extends from surface 424 of first planar member 408. Input port 406 is configured to be connected to a fluid source. For example, input port 406 may be connected to a bleed air source or an auxiliary power unit in these depicted examples.

As depicted, output port 407 is located on first planar member 408 on inner side 432 of structure 404. In this illustrative example, fluid flows out of output port 407 in a direction that moves with a selected frequency. The frequency may be selected by controlling pressure pulses applied to the chamber in structure 404 through first actuator 428 and second actuator 430.

Figure 5:
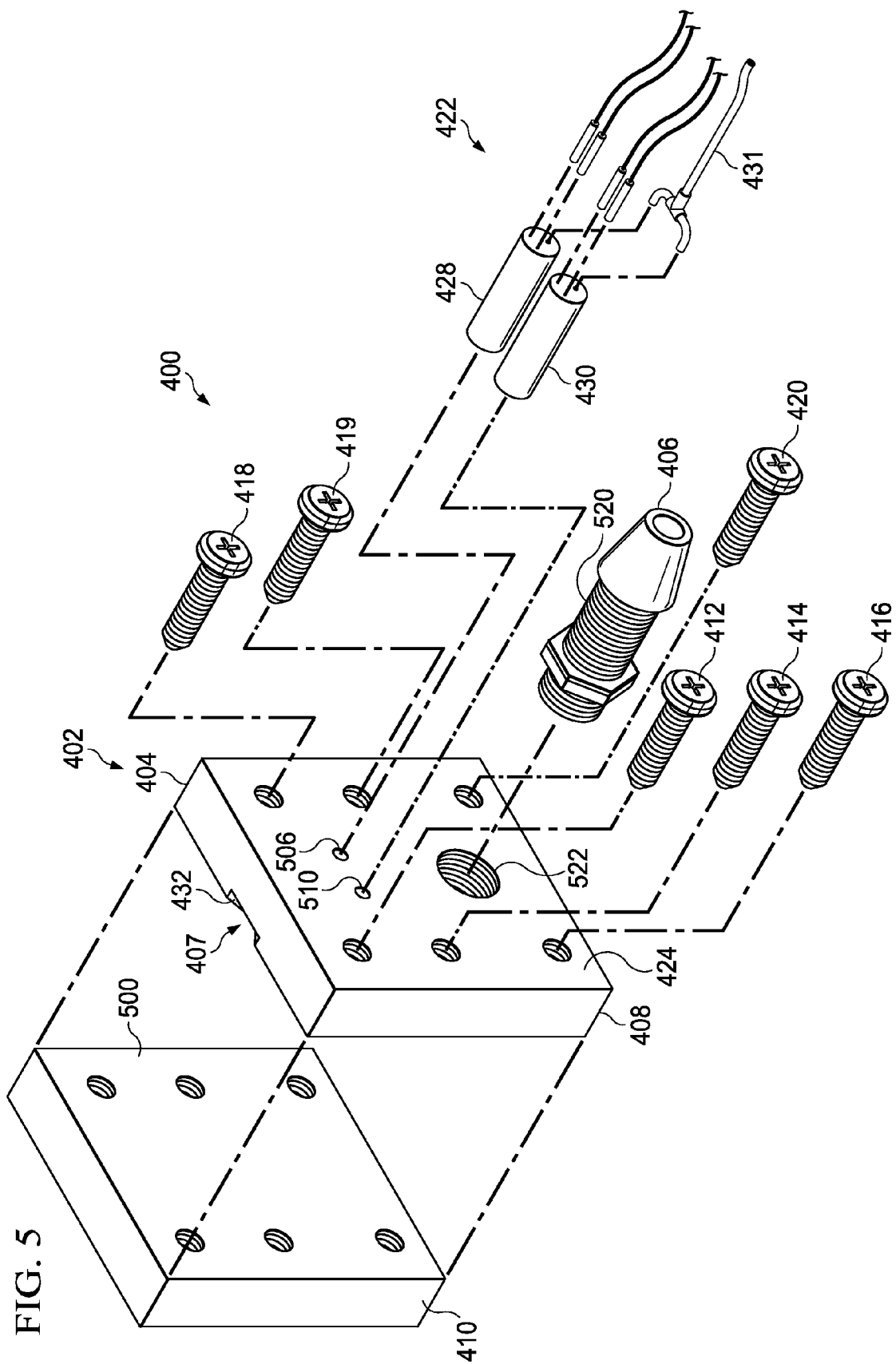
FIG. 5 is an exploded view of a flow control actuator in accordance with an illustrative embodiment.

Turning now to FIG. 5, an exploded view of a flow control actuator is depicted in accordance with an illustrative embodiment. In this exploded view of flow control actuator 400, inner side 500 of second planar member 410 is shown. Inner side 500 may contact inner side 432 of first planar member 408 when first planar member 408 and second planar member 410 are connected to each other.

In this view, first opening 506 and second opening 510 are present in first planar member 408. First actuator 428 may be in communication with first opening 506 and second actuator 430 may be in communication with second opening 510 when in an assembled form.

As depicted, input port 406 is comprised of connector 520 and opening 522. Connector 520 may be placed into opening 522 to form input port 406.

Figure 6:
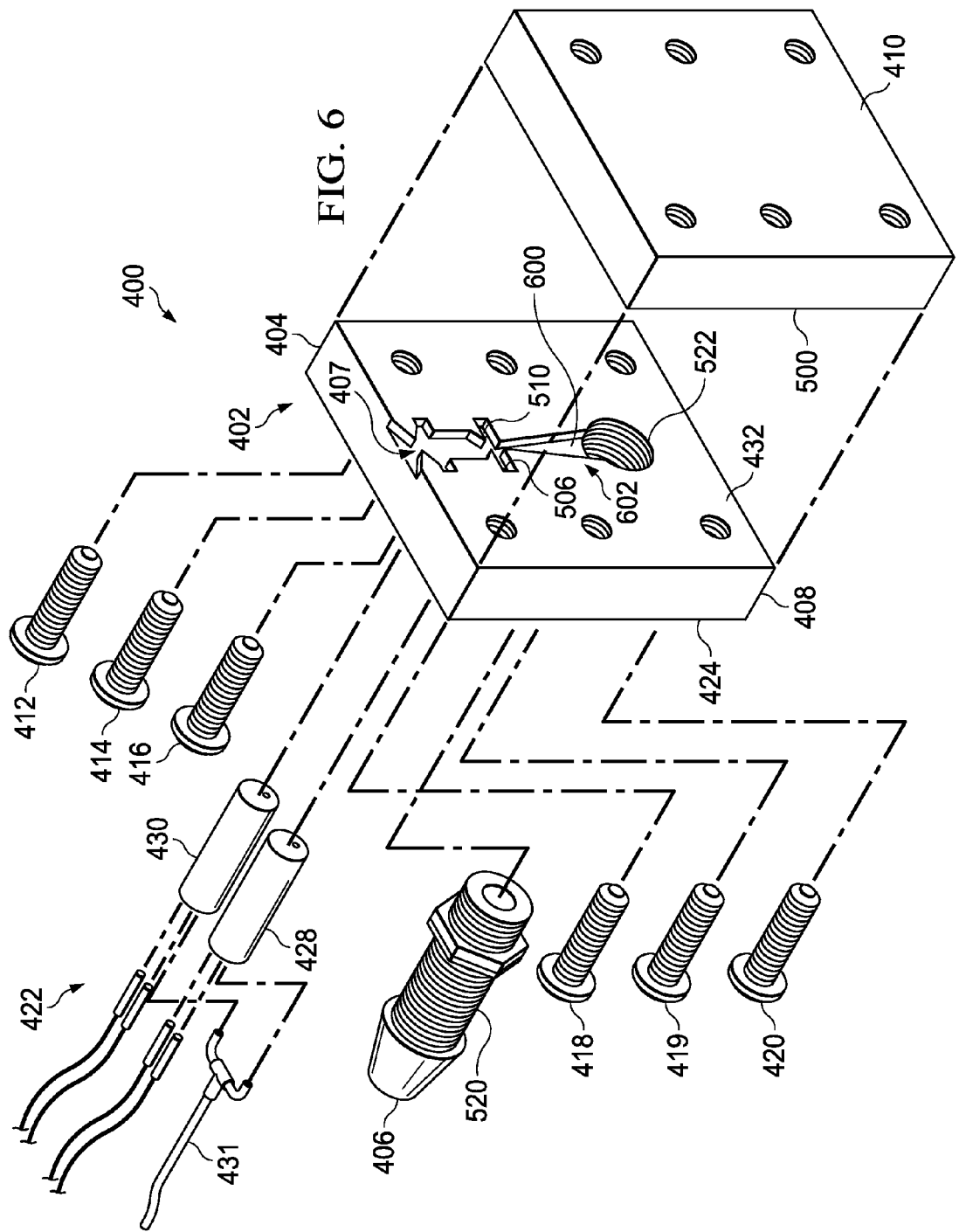
FIG. 6 is another illustration of an exploded view of a flow control actuator in accordance with an illustrative embodiment.

Turning now to FIG. 6, another illustration of an exploded view of a flow control actuator is depicted in accordance with an illustrative embodiment. In this exploded view of flow control actuator 400, chamber 600 is seen on inner side 432 of first planar member 408. Chamber 600 has volume 602 in this illustrative example.

As depicted, chamber 600 is in communication with first opening 506 and second opening 510. These openings are entry points for pressure pulses that may be generated by pressure source 422.

Figure 7:
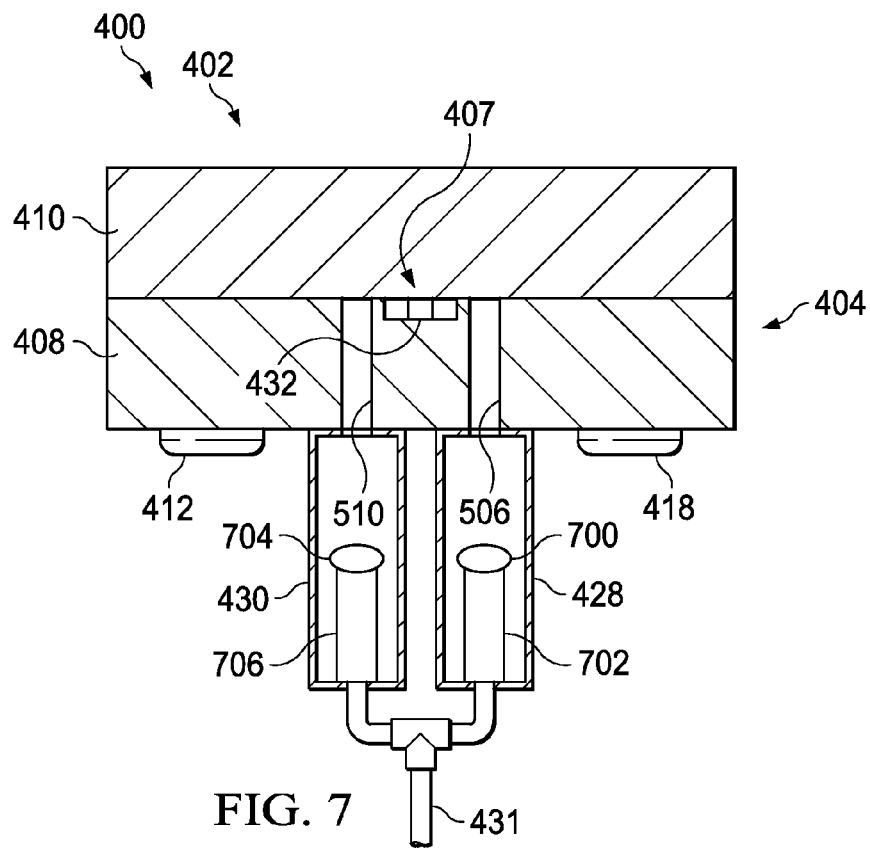
FIG. 7 is an illustration of a cross-sectional view of a flow control actuator in accordance with an illustrative embodiment.

With reference now to FIG. 7, an illustration of a cross-sectional view of a flow control actuator is depicted in accordance with an illustrative embodiment. As depicted, flow control actuator 400 is shown in a cross-sectional view taken along lines 7-7 in FIG. 4.

In this view, valve 700 is shown within interior 702 of first actuator 428. Valve 704 is shown within interior 706 of second actuator 430.

As depicted, valve 700 in first actuator 428 provides communication between line 431 and first opening 506. When valve 700 is open, fluid may flow through line 431 through valve 700 into first opening 506. By selectively opening and closing valve 700, pressure pulses may be sent through first opening 506.

In this illustrative example, valve 704 in second actuator 430 provides communication between line 431 and second opening 510. When valve 704 is open, fluid may flow through line 431 through valve 704 into second opening 510. By selectively opening and closing valve 704, pressure pulses may be sent through second opening 510.

Other components within first actuator 428 and second actuator 430 are not shown in this cross-sectional view. These components are omitted to avoid obscuring the illustration of features in the illustrative embodiment relating to generating pressure pulses.

Figure 8:
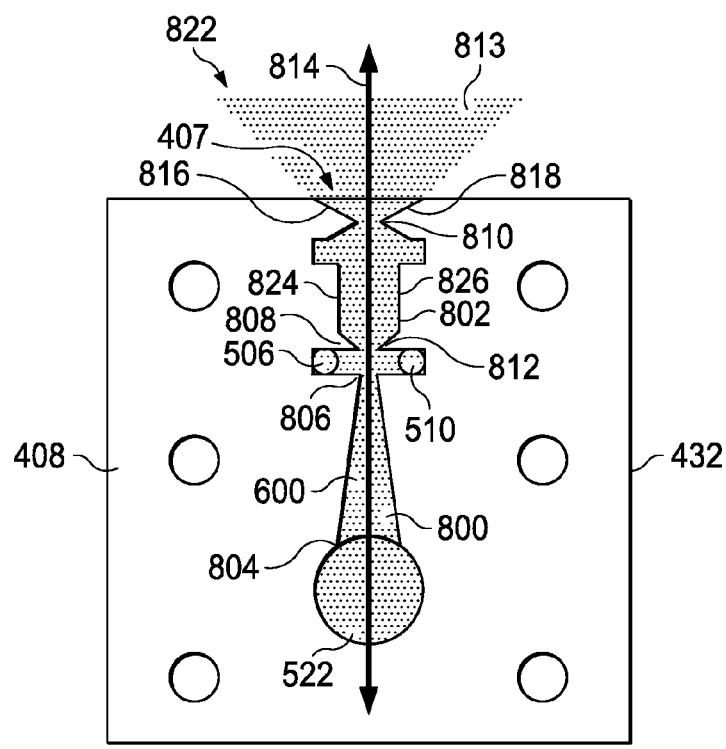
FIG. 8 is an illustration of an inner side of a first planar member in a flow control actuator in accordance with an illustrative embodiment;
}

With reference now to FIG. 8, an illustration of an inner side of a first planar member in a flow control actuator is depicted in accordance with an illustrative embodiment. In this figure, inner side 432 of first planar member 408 from FIG. 4 is illustrated.

As can be seen in this illustrative example, first planar member 408 has chamber 600. Chamber 600 includes first section 800 and second section 802. First section 800 of chamber 600 is in communication with opening 522 of input port 406 in FIG. 4 at first end 804 of first section 800. First section 800 may be configured to receive fluid 813 from input port 406 and may cause fluid 813 to flow at a desired rate. Second end 806 of first section 800 is in communication with first end 808 of second section 802 of chamber 600 through section 812. In this illustrative example, second end 810 of second section 802 is in communication with output port 407.

As used herein, a first component, first end 804 of first section 800, "connected to" a second component, second section 802, means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

Further, fluid 813 may flow out of output port 407 in a stream about axis 814 extending centrally through chamber 600. This stream may have various forms, such as a jet, a cone, a fan shape, or some other suitable form.

As can be seen in this illustrative example, when fluid 813 flows out of flow control actuator 400 at output port 407, fluid 813 may spread out to cover area 822. As depicted, area 822 represents an extent of flow for fluid 813.

The extent of area 822 outside of flow control actuator 400 may depend on the configuration of output port 407. Output port 407 may be made such that area 822 may be wider or narrower, or have other configurations depending on the particular implementation.

In this illustrative example, pressure pulses may be applied to at least one of first opening 506 and second opening 510 in chamber 600 and are configured to cause fluid 813 to oscillate between first side 824 of second section 802 and second side 826 of second section 802. In other words, pressure pulses may be applied to first opening 506 and second opening 510 in an alternating manner to cause fluid 813 to oscillate between first side 824 and second side 826 of second section 802. This oscillation between first side 824 and second side 826 is configured to cause an oscillation of fluid 813 as it exits flow control actuator 400 at output port 407. The oscillation of fluid 813 may be between first side 816 and second side 818 of output port 407 in FIG. 4.

In the illustrative examples, the oscillation of fluid 813 may occur using energy levels of less than about 5 percent of the energy in fluid 813 as an input to generating the pressure pulses through first opening 506 and second opening 510 as it exits flow control actuator 400 at output port 407. The energy level may be expressed as pressure magnitude multiplied by pulse duration. The selection of the energy level may be made to reduce the use of external energy needed to cause fluid 813 to oscillate.

In this manner, the application of pressure pulses into second section 802 of chamber 600 through first opening 506 and second opening 510 may cause fluid 813 to oscillate within second section 802, which in turn causes oscillation of fluid 813 when fluid 813 flows out of output port 407. At least one of the frequency and phase of this oscillation may be adjusted by adjusting the manner in which pressure pulses are applied through first opening 506 and second opening 510 in second section 802 of chamber 600.

Figure 9:
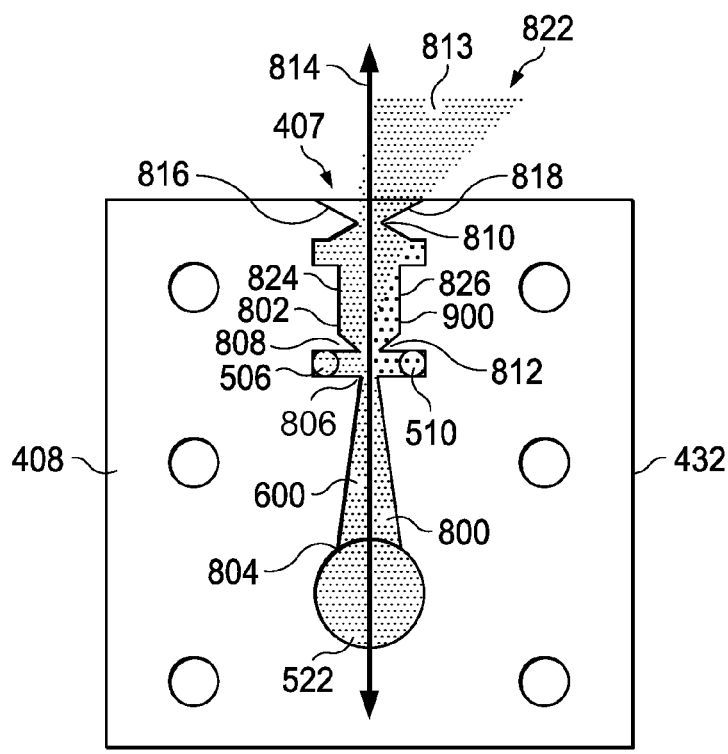
FIGS. 9-11 are illustrations of oscillations of fluid flow for a flow control actuator in accordance with an illustrative embodiment.
Figure 10:
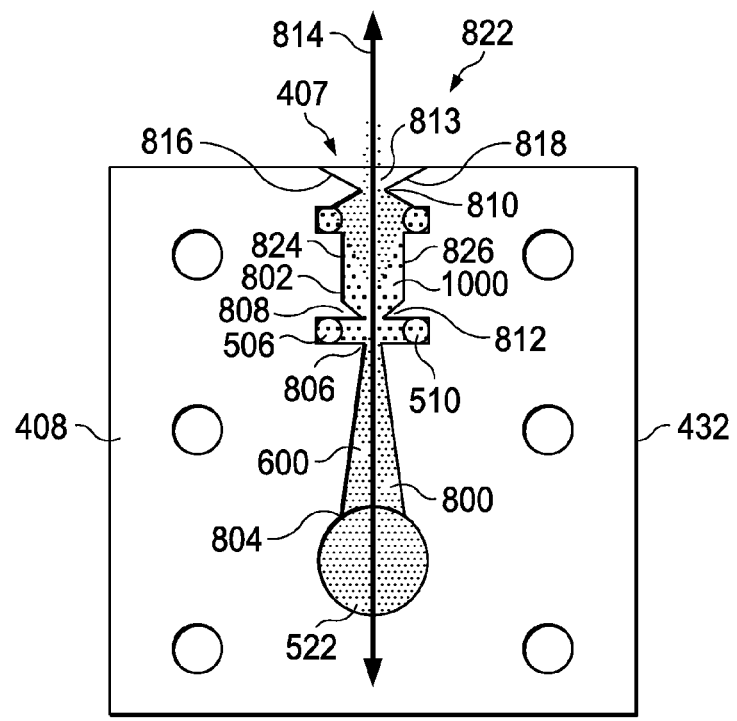
Figure 11:
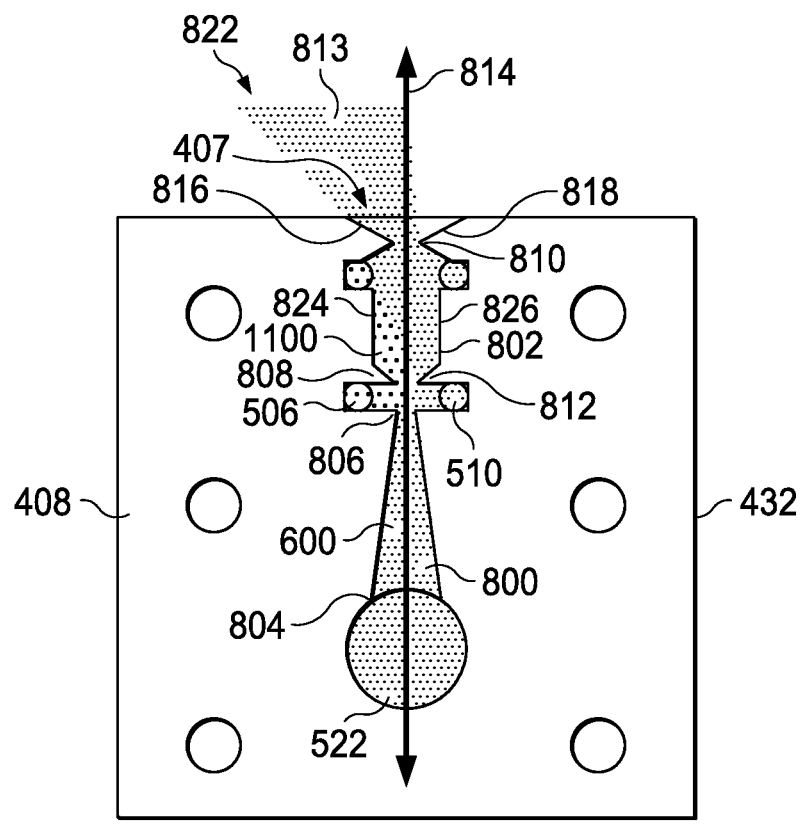

Turning now to FIGS. 9-11, illustrations of oscillations of fluid flow for a flow control actuator are depicted in accordance with an illustrative embodiment. In FIG. 9, an illustration of fluid flow out of a flow control actuator is shown. In this illustration, fluid 813 flows through second section 802 such that fluid is present on first side 824 with an absence of fluid 813 on a portion of second side 826 in second section 802 of chamber 600. This flow of fluid 813 results in fluid 813 flowing out of output port 407 toward second side 826 with a flow of fluid 813 in area 900 on first side 824 being substantially absent.

In this figure, a pressure pulse has been previously applied to second opening 510. In this illustration, the application of the pressure pulse to second opening 510 results in the flow of fluid 813 in area 822 to be in a direction that is towards second side 818 of output port 407.

In FIG. 10, an illustration of a flow of fluid out of a flow control actuator is depicted in accordance with an illustrative embodiment. In this example, a pressure pulse has been applied to second opening 510 in second section 802 of chamber 600.

Within chamber 600, fluid 813 sweeps or moves to flow out of output port 407 from second side 826 toward first side 824 in response to the pressure pulse applied to first opening 506. Fluid 813 flowing within second section 802 of chamber 600 flows mainly about axis 814 as the flow of fluid 813 shifts from flowing on first side 824 to second side 826. Flow of fluid 813 is substantially absent in area 1000 in second section 802 of chamber 600 in this example.

As depicted, fluid 813 flows out of output port 407 in a direction substantially along axis 814. In this illustration, the flow of fluid 813 has moved toward second side 818 and is moving away from first side 816 of output port 407 in response to the pressure pulse applied to first opening 506.

Turning now to FIG. 11, an illustration of a flow of fluid out of a flow control actuator is depicted in accordance with an illustrative embodiment. In this depicted example, fluid 813 flows through second section 802 of chamber 600 with fluid 813 being mostly against second side 826 rather than first side 824. Fluid flow is substantially absent from area 1100 on first side 824 of second section 802 of chamber 600 in these illustrative examples. This type of flow through second section 802 results in the flow of fluid 813 in area 822 to be in a direction that is towards first side 816 of output port 407.

The flow of fluid 813 remains on first side 816 of output port 407 until a pressure pulse is applied to second opening 510. An application of the pressure pulse to second opening 510 will cause the flow of fluid 813 to sweep back towards second side 818.

In this manner, an application of pressure pulses to first opening 506 and second opening 510 may be made to cause fluid 813 to move from side to side. In these illustrative examples, fluid 813 moves from one side to another side in response to the pressure pulse through one of first opening 506 and second opening 510.

The application of pressure pulses to first opening 506 and second opening 510 may be applied in a manner that results in a movement in the direction at which fluid 813 flows with a desired frequency. In these illustrative examples, the frequency alternating between pressure pulses applied to first opening 506 and second opening 510 correspond to the frequency at which fluid 813 oscillates or sweeps between first side 816 and second side 818 of output port 407.

Figure 12:
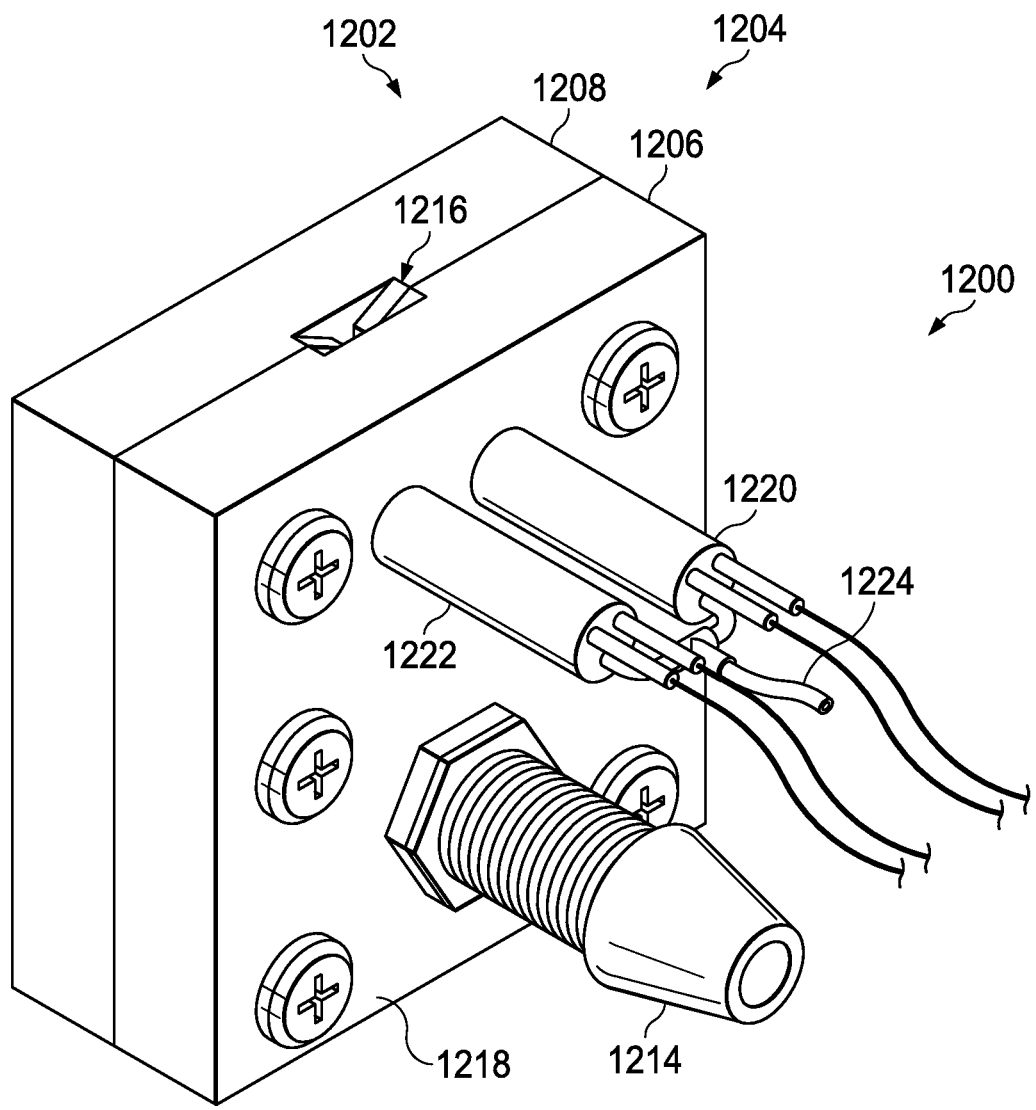
FIG. 12 is an illustration of a flow control actuator in accordance with an illustrative embodiment.

Turning now to FIG. 12, an illustration of a flow control actuator is depicted in accordance with an illustrative embodiment. In this depicted example, flow control actuator 1200 takes the form of fluidic oscillator 1202. Flow control actuator 1200 is an example of another physical implementation for flow control actuator 200 shown in block form in FIG. 2.

In this illustrative example, structure 1204 is comprised of first planar member 1206 and second planar member 1208. Structure 1204 has input port 1214 and output port 1216.

In this illustrative example, input port 1214 extends from surface 1218 of first planar member 1206. In this illustrative example, output port 1216 is not located just in first planar member 1206. Output port 1216 is located in both first planar member 1206 and second planar member 1208 in this illustrative example. Additionally, first actuator 1220 and second actuator 1222 are associated with a first opening (not shown) in first planar member 1206 and a second opening (not shown) in first planar member 1206. First actuator 1220 and second actuator 1222 are connected to line 1224.

Figure 13:
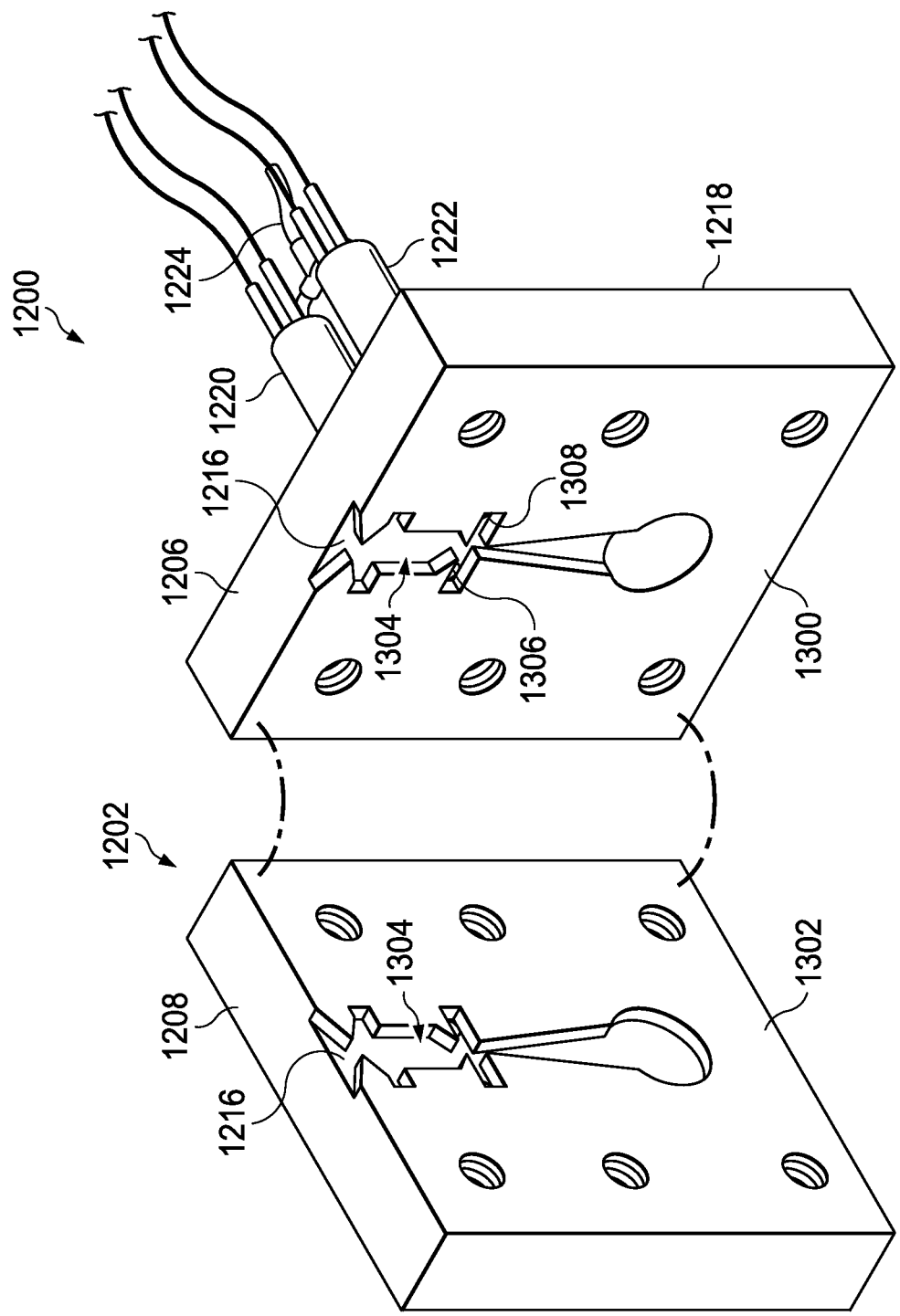
FIG. 13 is an illustration of a view of inner sides of planar members in a flow control actuator in accordance with an illustrative embodiment.

Turning now to FIG. 13, an illustration of a view of inner sides of planar members in a flow control actuator is depicted in accordance with an illustrative embodiment. In this example, inner side 1300 for first planar member 1206 and inner side 1302 for second planar member 1208 are shown. In this illustrative example, chamber 1304 is formed in both inner side 1300 of first planar member 1206 and inner side 1302 of second planar member 1208.

Additionally, first opening 1306 and second opening 1308 are located on inner side 1300 of first planar member 1206.

The different components shown in FIG. 1 and FIGS. 4-13 may be combined with components in FIGS. 2 and 3, used with components in FIGS. 2 and 3, or a combination of the two. Additionally, some of the components in FIG. 1 and FIGS. 4-13 may be illustrative examples of how components shown in block form in FIGS. 2 and 3 can be implemented as physical structures.

Figure 14:
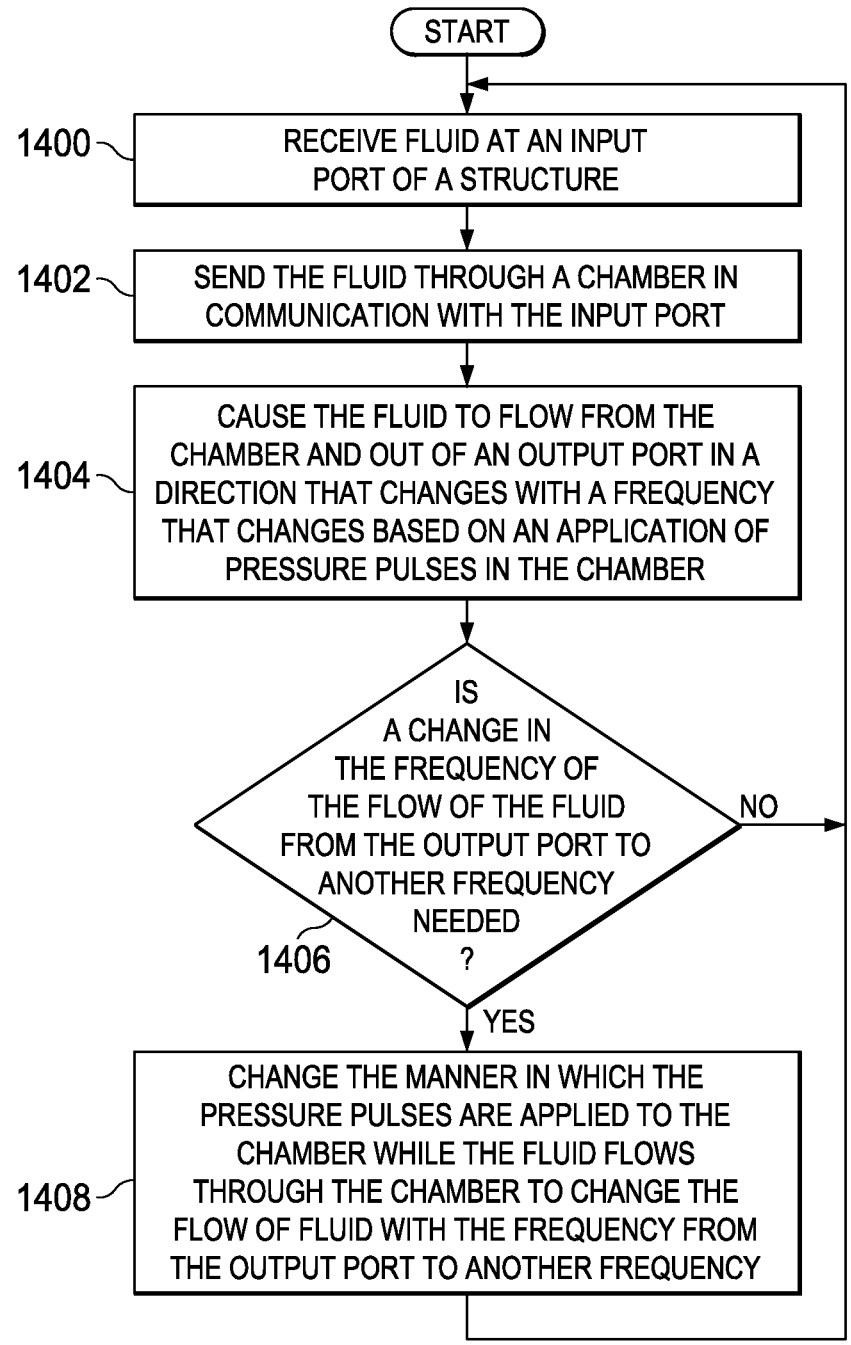
FIG. 14 is an illustration of a flowchart of a process for managing flow of fluid in accordance with an illustrative embodiment.

With reference now to FIG. 14, an illustration of a flowchart of a process for managing flow of fluid is depicted in accordance with an illustrative embodiment. The process illustrated in FIG. 14 may be implemented in flow control actuator 200 in FIG. 2. In particular, the process may be implemented using flow control actuator 200 in aircraft 100 in FIG. 1 or some other suitable type of platform.

The process begins by receiving fluid at an input port of a structure (operation 1400). The process then sends the fluid through a chamber in communication with the input port (operation 1402). The process then causes the fluid to flow from the chamber and out of an output port in a direction that changes with a frequency based on an application of pressure pulses in the chamber (operation 1404). In these illustrative examples, the pressure pulses are applied to different sides of the chamber through a first opening and a second opening in the chamber. Each time a pressure pulse is applied to one of the sides, the flow of fluid out of the output port may move to another side of the output port.

A determination is made as to whether a change in the frequency of the flow of the fluid from the output port to another frequency is needed (operation 1406). If a change is not needed, the process returns to operation 1400. Otherwise, the process changes the manner in which the pressure pulses are applied to the chamber while the fluid flows through the chamber to change the flow of fluid with the frequency from the output port to another frequency (operation 1408), with the process then returning to operation 1400. These operations may occur until fluid flow is no longer desired from the structure.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 15, an illustration of timing diagrams for a flow control actuator is depicted in accordance with an illustrative embodiment. Timing diagrams 1500 are examples of timing diagrams that may be generated for flow control actuator 200 in FIG. 2. Timing diagram 1502 illustrates oscillations in the flow of fluid at output port 208 in FIG. 2. X-axis 1504 represents time, while Y-axis 1506 represents a side at which fluid flow occurs at output port 208.

Timing diagram 1508 illustrates pressure pulses 218 applied to first opening 214 in chamber 210 in FIG. 2. X-axis 1510 represents time, while time Y-axis 1512 represents a magnitude of a pressure pulse applied to first opening 214.

Next, timing diagram 1514 illustrates pressure pulses 218 applied to second opening 216 in chamber 210 in FIG. 2. X-axis 1516 represents time, while time Y-axis 1518 represents a magnitude of a pressure pulse applied to second opening 216.

In these illustrative examples, the pressure pulse has a duration that is selected to cause the flow of fluid to change direction from one side of output port 208 to the other side of output port 208. For example, the pressure pulse may have a duration of about 0.25 milliseconds to about 25 milliseconds. The magnitude of the pressure pulse may be selected to be proportional to the total pressure of the fluid flowing in the cavity, stagnation pressure of the fluid flowing in the cavity, or in some other suitable manner.

As can be seen in this illustrative example, a pressure pulse is applied at time T0 to first opening 214. As can be seen, the flow of fluid in timing diagram 1502 is on second side 228 of output port 208. At time T1, a pressure pulse is applied to second opening 216. This pressure pulse causes the flow of fluid to move back to first side 226 of output port 208. At time T3 a pressure pulse is applied to first opening 214. This causes the flow of fluid to move back to second side 228 of output port 208. At time T4, a pressure pulse is applied to second opening 216. This pressure pulse causes the flow of fluid to move back to first side 226 of output port 208.

At time T5, a pressure pulse is applied at first opening 214. This pressure pulse causes the flow of fluid to move from first side 226 to second side 228 of output port 208. At time T6, a pressure pulse is applied at second opening 216. As a result, the fluid flow at output port 208 returns to the first side 226 of output port 208. At time T7, a pressure pulse is applied to first opening 214. This pressure pulse causes the flow of fluid to move back from first side 226 to second side 228 at output port 208.

As can be seen, the frequency between the alternating pressure pulses to first opening 214 and second opening 216 has increased at time T6. As a result, the movement of the flow of fluid between first side 226 and second side 228 also increases in frequency. In other words, the amount of time between movement of the flow of fluid between first side 226 and second side 228 of output port 208 increases.

Also, when a pressure pulse is not applied to either first opening 214 or second opening 216, the flow of fluid at output port 208 does not move between first side 226 and second side 228 of output port 208.

Illustrative embodiments of the disclosure may be described in the context of aircraft manufacturing and service method 1600 as shown in FIG. 16 and aircraft 1700 as shown in FIG. 17. Turning first to FIG. 16, an illustration of an aircraft manufacturing and service method is depicted in accordance with an illustrative embodiment. Flow control actuator 200 and the components found in flow control actuator 200 may be manufactured or reconfigured in the steps shown in this figure. During pre-production, aircraft manufacturing and service method 1600 may include specification and design 1602 of aircraft 1700 in FIG. 17 and material procurement 1604.

During production, component and subassembly manufacturing 1606 and system integration 1608 of aircraft 1700 in FIG. 17 takes place. Thereafter, aircraft 1700 in FIG. 17 may go through certification and delivery 1610 in order to be placed in service 1612. While in service 1612 by a customer, aircraft 1700 in FIG. 17 is scheduled for routine maintenance and service 1614, which may include modification, reconfiguration, refurbishment, and other maintenance or service.

Each of the processes of aircraft manufacturing and service method 1600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of an aircraft is depicted in which an illustrative embodiment may be implemented. In this example, aircraft 1700 is produced by aircraft manufacturing and service method 1600 in FIG. 16 and may include airframe 1702 with plurality of systems 1704 and interior 1706. Examples of systems 1704 include one or more of propulsion system 1708, electrical system 1710, hydraulic system 1712, and environmental system 1714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1600 in FIG. 16. For example, flow control actuators may be designed for use in aircraft 1700 during specification and design 1602. The flow control actuators may be manufactured during component and subassembly manufacturing 1606 and installed during system integration 1608. In these illustrative examples, the flow control actuators may be tested during certification and delivery 1610 and used to control the flow of fluids while in service 1612. Additionally, flow control actuators may be added or replaced during maintenance, upgrades, or refurbishment in maintenance and service 1614.

Thus, the illustrative embodiments provide a method and apparatus for controlling the flow of a fluid out of a flow control actuator. In the illustrative embodiments, the frequency at which fluid changes directions when flowing out of an output port in a flow control actuator may be changed. This frequency or sweeping of the fluid flow may be changed in a manner that does not require a change in the pressure of fluid input into the flow control actuator at an input port.

In the illustrative examples, the change in the direction of fluid flow is caused by the application of pressure pulses to the chamber in which the fluid flows. In these illustrative examples, the pressure pulses are applied to a first opening and a second opening in the chamber in an alternating manner that causes the fluid to flow out of the output port with a desired frequency. In this manner, the amount of fuel or energy needed to operate a fluid source may be reduced. Further, by maintaining the flow of fluid at substantially the same level, changes in fluid flow may not occur that may affect the control being initiated using a fluid flow actuator.

The description of the different illustrative embodiments has been presented for purposes of illustration and description, and is not intended to be exhaustive or limited to the embodiments in the form disclosed. Many modifications and variations will be apparent to those of ordinary skill in the art.

Although the illustrative examples for an illustrative embodiment are described with respect to an aircraft, an illustrative embodiment may be applied to other types of platforms. The platform may be, for example, a mobile platform, a stationary platform, a land-based structure, an aquatic-based structure, and a space-based structure. More specifically, the platform may be a surface ship, a tank, a personnel carrier, a train, a spacecraft, a space station, a satellite, a submarine, an automobile, a power plant, a bridge, a dam, a manufacturing facility, a building, and other suitable objects.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus that comprises a structure that comprises:
    an input port directly connected to an opening through a first planar member;
    a single output port; and
    a chamber within the structure, such that the chamber comprises an indentation in the first planar member that aligns with an indentation in a second planar member, the first planar member connected to the second planar member such that the connection forms the chamber and the chamber comprises:
        a first section directly connected to a second section at a rectangular shaped portion of the second section, such that the first section comprises a width less than a diameter of the opening through the first planar member such that the width reduces, along a direction of flow of a fluid from the opening through the first planar member to the second section, until the first section connects to the second section;
        a first side of the second section and a second side of the second section configured to diverge, along a direction of flow of the fluid from the rectangular shaped portion of the second section to the single output port, from each other and an axis that extends centrally through the chamber, until the first side and second side substantially parallel each other until the first side and the second side turn substantially 180 degrees away from each other and then return substantially parallel to each other before the first side and second side converge, along the direction of flow of the fluid from the rectangular shaped portion of the second section to the single output port, toward each other, and the axis that extends centrally through the chamber, until the first side and second side directly connect to the single output port, such that the chamber is configured to channel the fluid from the input port to the single output port of the structure, such that the opening through the first planar member connects to the first section and comprises a central axis of the opening through a depth of the first planar member and substantially perpendicular to the axis that extends centrally through the chamber;
        a first opening in the rectangular shaped portion of the second section; and
        a second opening in the rectangular shaped portion of the second section, such that the first opening and the second opening are configured to receive pressure pulses through a first actuator and a second actuator respectively, such that each actuator extends from the first planar member with a respective central axis of each actuator being substantially parallel to the central axis of the opening through the first planar member, and each actuator configured to inject an energy level into the flow of the fluid from the rectangular shaped portion of the second section to the single output port, such that the energy level that each actuator injects remains less than 5% of an energy level of the fluid flow as it exits the single output port, such that a pressure magnitude of a pulse, of the pressure pulses, injected by each actuator, multiplied by a duration of the pulse injected by each actuator determines the energy level injected into the flow of the fluid from the rectangular shaped portion of the second section to the single output port.

2. The apparatus of claim 1 further comprising:
    a pressure source in communication with the first opening and the second opening, wherein the pressure source is configured to generate the pressure pulses.

3. The apparatus of claim 2, wherein the pressure source is selected from at least one of a pressurized fluid source, an acoustic system, a laser system, a spark generation unit.

4. The apparatus of claim 1, wherein the pressure pulses applied to one of the first opening and the second opening are configured to cause a change in a direction of flow of the fluid out of the single output port.

5. The apparatus of claim 4, wherein the change in the direction of the flow of the fluid out of the single output port is a sweeping motion of the fluid between a first side of the single output port and a second side of the single output port.

6. The apparatus of claim 1, wherein the first opening is located on a first side of the single output port and the second opening is located on a second side of the single output port and wherein a first pressure pulse in the pressure pulses applied to the first opening is configured to cause a flow of the fluid occurring on the first side of the single output port to change direction to the second side of the single output port and a second pressure pulse in the pressure pulses applied to the second opening is configured to cause the flow of the fluid occurring on the second side of the single output port to change direction to the first side of the single output port.

7. The apparatus of claim 4, wherein a frequency of the change in the direction of the flow of the fluid out of the single output port is based on a frequency of the pressure pulses applied to the first opening and the second opening.

8. The apparatus of claim 1, wherein the chamber further comprises:
    the first section configured to receive the fluid from the input port and cause the fluid to flow at a desired rate when exiting the first section; and
    the second section in communication with the first section and configured to cause the fluid to move between the first side and the second side in the second section in response to the pressure pulses being applied to the first opening and the second opening, wherein the second section is in communication with the single output port and wherein the single output port is configured to cause the fluid flowing between the first side and second side in the second section to sweep with a frequency between a first side of the single output port and a second side of the single output port.

9. The apparatus of claim 8, wherein the first opening is located on the first side of the second section and the second opening is located on the second side of the second section.

10. The apparatus of claim 1, wherein the first opening is located opposite to the second opening about the axis that extends centrally though the chamber.

11. The apparatus of claim 1, wherein the structure is comprised of a material selected from one of a metal, a plastic, steel, aluminum, titanium, and polycarbonate.

12. The apparatus of claim 1, wherein the fluid is selected from one of air, a liquid fuel, and a gas fuel.

13. A fluid flow control system comprising:
a plurality of flow control actuators, wherein each of the plurality of flow control actuators comprises a structure that comprises:
an input port directly connected to an opening through a first planar member;
a single output port; and
a chamber within the structure;
the first planar member connected to a second planar member such that the connection forms the chamber and the chamber comprises:
a first section directly connected to a second section at a rectangular shaped portion of the second section, such that the first section comprises a width less than a diameter of the opening through the first planar member such that the width reduces, along a direction of flow of a fluid from the opening through the first planar member to the second section, until the first section connects to the second section;
a first side of the second section and a second side of the second section configured to diverge, along a direction of flow of the fluid from the rectangular shaped portion of the second section to the single output port, from each other and an axis that extends centrally through the chamber, until the first side and second side substantially parallel each other until the first side and the second side turn substantially 180 degrees away from each other and then return substantially parallel to each other before the first side and second side converge, along the direction of flow of the fluid from the rectangular shaped portion of the second section to the single output port, toward each other and the axis that extends centrally through the chamber until the first side and second side directly connect to the single output port, such that the chamber is configured to channel the fluid from the input port to the single output port of the structure, such that the opening through the first planar member connects to the first section and comprises a central axis of the opening through a depth of the first planar member and substantially perpendicular to the axis that extends centrally through the chamber;
a first opening in the rectangular shaped portion of the second section;
a second opening in the rectangular shaped portion of the second section; and
a pressure source connected to a first actuator and a second actuator, each actuator configured to send pressure pulses to the first opening and the second opening respectively, such that each actuator extends from the first planar member with a respective central axis of each actuator being substantially parallel to the central axis of the opening through the first planar member.

14. The fluid flow control system of claim 13, wherein the pressure source is configured to send the pressure pulses to one of the first opening and the second opening in the each of the plurality of flow control actuators in a manner that controls a direction of a flow of the fluid from the each of the plurality of flow control actuators.

15. The fluid flow control system of claim 13, wherein the fluid is selected from one of air, a liquid fuel, and a gas fuel.

16. A method for managing a flow of a fluid, the method comprising:
connecting a first planar member to a second planar member such that the connection forms a chamber comprising:
an opening through a depth of the first planar member;
a first section directly connected to a rectangular shaped portion of a second section, such that the first section comprises a width less than a diameter of the opening through the first planar member such that the width reduces, along a direction of flow of the fluid from the opening through the first planar member to the second section, until the first section connects to the second section;
a first side of the second section and a second side of the second section configured to diverge, along a direction of flow of the fluid from the rectangular shaped portion of the second section to a single output port, from each other and an axis that extends centrally through the chamber, until the first side and second side substantially parallel each other until the first side and the second side turn substantially 180 degrees away from each other and then return substantially parallel to each other before the first side and second side converge, along the direction of flow of the fluid from the rectangular shaped portion of the second section to the single output port, toward each other and the axis that extends centrally through the chamber until the first side and second side directly connect to the single output port, such that the chamber is configured to channel the fluid from an input port to a single output port of a structure;
receiving the fluid at the input port of the structure, such that the input port connects to the chamber via the opening through the depth of the first planar member, a central axis of the opening being substantially perpendicular to the axis that extends centrally through the chamber;
sending the fluid through the chamber in communication with the opening directly in communication with the input port; and
causing the fluid to flow from the chamber and out of the single output port in a direction that changes with a frequency based on applying pressure pulses in the chamber via a second opening located in the rectangular shaped portion of the second section and connected to an actuator that extends from the first planar member, the actuator configured comprising a central axis of the actuator being substantially parallel to the central axis of the opening through the first planar member, such that an energy level of a pulse of the pressure pulses remains less than 5% of an energy level of the fluid as it flows out the single output port, such that the energy level of the pulse equals a magnitude of the pulse multiplied by a duration of the pressure pulse.

17. The method of claim 16 further comprising:
applying the pressure pulses in the chamber though an additional opening in the chamber and an additional actuator.

18. The method of claim 17 further comprising:
applying the pressure pulses to the additional opening and the second opening in the chamber in an alternating manner that causes the fluid to flow out of the single output port with the frequency.

19. The method of claim 16, wherein the change in the direction of the flow of the fluid out of the single output port is a sweeping motion of the fluid between a first side of the single output port and a second side of the single output port.

20. The method of claim 16, wherein the chamber comprises:
   the first section receiving the fluid from the input port and causing the fluid to flow at a desired rate when exiting the first section; and
   the second section communicating with the first section and causing the fluid to move between the first side and the second side in the second section in response to the pressure pulses being applied to an additional opening and the second opening, wherein the second section is in communication with the single output port and wherein the single output port is configured to cause the fluid flowing between the first side and the second side in the second section to sweep with the frequency between a first side of the single output port and a second side of the single output port.

\* \* \* \* \*